United States Patent
Park et al.

(10) Patent No.: US 12,530,530 B2
(45) Date of Patent: Jan. 20, 2026

(54) NAMED ENTITY RECOGNITION SYSTEM AND NAMED ENTITY RECOGNITION METHOD

(71) Applicants: Hyundai Motor Company, Seoul (KR); Kia Corporation, Seoul (KR)

(72) Inventors: Cheoneum Park, Gyeonggi-do (KR); Mirye Lee, Seoul (KR); Juae Kim, Seoul (KR); Cheongjae Lee, Gyeonggi-do (KR); Donghyeon Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 303 days.

(21) Appl. No.: 18/065,891

(22) Filed: Dec. 14, 2022

(65) Prior Publication Data
US 2023/0205998 A1    Jun. 29, 2023

(30) Foreign Application Priority Data
Dec. 27, 2021    (KR) .................. 10-2021-0188485

(51) Int. Cl.
  *G06F 40/295*    (2020.01)
  *G06F 40/103*    (2020.01)
  (Continued)

(52) U.S. Cl.
  CPC .......... *G06F 40/295* (2020.01); *G06F 40/103* (2020.01); *G06F 40/126* (2020.01);
  (Continued)

(58) Field of Classification Search
  CPC .... G06F 40/295; G06F 40/103; G06F 40/126; G06F 40/151; G10L 15/18; G10L 15/22;
  (Continued)

(56) References Cited

U.S. PATENT DOCUMENTS 10,303,763 B2    5/2019  Beller et al.
2016/0012020 A1*  1/2016  George .................. G06F 40/30
                                                                704/9
(Continued)

FOREIGN PATENT DOCUMENTS

KR    10-2015-0066361 A    6/2015
KR    10-2018-0044800 A    5/2018
(Continued)

OTHER PUBLICATIONS

5. Qin et al., ("A BERT-BiGRU-CRF Model for Entity Recognition of Chinese Electronic Medical Records." Complexity 2021.1 (2021): 6631837) (Year: 2021).*

(Continued)

*Primary Examiner* — Bhavesh M Mehta
*Assistant Examiner* — Jangwoen Lee
(74) *Attorney, Agent, or Firm* — Fox Rothschild LLP

(57) ABSTRACT

Provided is a named entity recognition system, including: an input module configured to recognize a speech input of a user and convert the speech input into text; a preprocessing module configured to separate the text in units of syllables and perform transformation; and a learning module configured to perform multi-task learning for recognizing a named entity and identifying a boundary of spacing with respect to the transformed text, and output a result of recognizing the named entity and a result of identifying the boundary of spacing, based on recognizing the named entity and identifying the boundary of spacing.

12 Claims, 12 Drawing Sheets

(51) Int. Cl.
  *G06F 40/126* (2020.01)
  *G06F 40/151* (2020.01)
  *G10L 15/18* (2013.01)
  *G10L 15/22* (2006.01)

(52) U.S. Cl.
  CPC ............ *G06F 40/151* (2020.01); *G10L 15/18* (2013.01); *G10L 15/22* (2013.01)

(58) Field of Classification Search
  CPC ....... G10L 15/26; G10L 17/02; G10L 15/063; G10L 15/30; G10L 2015/221; B60R 16/0373
  See application file for complete search history.

(56) References Cited

U.S. PATENT DOCUMENTS

| | | | |
|---|---|---|---|
| 2018/0330729 A1* | 11/2018 | Golipour | G10L 15/26 |
| 2018/0365211 A1* | 12/2018 | Xu | G06F 40/242 |
| 2020/0097718 A1* | 3/2020 | Schäfer | G06V 20/62 |
| 2020/0334520 A1 | 10/2020 | Chen et al. | |
| 2022/0172269 A1* | 6/2022 | Shan | G06Q 30/0201 |
| 2022/0188520 A1* | 6/2022 | Iso-Sipila | G06F 40/295 |

FOREIGN PATENT DOCUMENTS

| | | |
|---|---|---|
| KR | 10-2019-0107616 A | 9/2019 |
| KR | 10-2095684 | 3/2020 |

OTHER PUBLICATIONS

4. Peng et al., ("Unsupervised cross-domain named entity recognition using entity-aware adversarial training." Neural Networks 138 (2021): 68-77) (Year: 2021).*

Peng et al., ("Unsupervised cross-domain named entity recognition using entity-aware adversarial training." Neural Networks 138 (2021): 68-77) (Year: 2021).*

C. Park et al., "Korean Named Entity Recogniation using Knowledge Distillation based on Ensemble", DBpia, pp. 368-370 (2019).

S. Na et al., "Character-Based LSTM CRFs for Named Entity Recogniation", DBpia, pp. 729-731 (2016).

C. Lee et al., "Named Entity Recognition using Deep Learning", DBpia, pp. 423-425 (2014).

J. Min et al., "RoBERTa for Korean Natural Language Processing: Named Entity Recognition, Sentiment Analysis, Dependency Parsing", DBpia, pp. 407-409 (2019).

S. Yang et al., "DeNERT: Named Entity Recognition Model using DQN and BERT", Journal of the Korea Society of Computer and Information, 25:4, pp. 29-35 (Apr. 2020).

C. Lee et al., "Fine-Grained Named Entity Recognition using Conditional Random Fields for Question Answering", DBpia, pp. 268-272 (2019).

K. Park et al., "BERT for Korean Natural Language Processing: Named Entity Tagging, Sentiment Analysis, Dependency Parsing and Semantic Role Labeling", DBpia, pp. 584-586 (2019).

Y. Lee et al., "ALBERT for Korean Natural Language Processing: Named Entity Recognition, Sentiment Analysis, Machine Reading Comprehension", DBpia, pp. 332-334 (2020).

Q. Peng et al., An Entity-Aware Adversarial Domain Adaptation Network for Cross-Domain Named Entity Recognition (Student Abstract), Preliminary Preprint Version (May 8, 2021).

Y. Xu et al., "Named Entity Recognition for Chinese Social Media with Domain Adversarial Training and Language Modeling", Alibaba Group (Sep. 9, 2019).

* cited by examiner

FIG. 3

| REPRESENTATIVE QUESTION |
|---|
| HOW MANY AIRBAGS ARE INSTALLED IN THE CAR? |
| HOW DO I UNFASTEN SEAT BELT? |

FIG. 6

| SPOKEN TEXT | CHA AE SEOLCHIDOEN AEEOBAEG I CHONG MYEOT GAEYA? |
|---|---|
| NORMALIZATION RESULT | CHA AE SEOLCHIDOEN AEEOBAEG I CHONG MYEOT GAEYA |
| SYLLABLE ANALYSIS RESULT | CHA AE SEOL CHI DOEN AE EO BAEG I CHONG MYEOT GAE YA |
| NAMED ENTITY RECOGNITION | B 0 0 0 0 B I I 0 0 0 0 0 |

FORMAT CONVERSION FOR NAMED ENTITY RECOGNITION -> B: NAMED ENTITY BEGINS, I: NAMED ENTITY CONTINUES , 0: TOKEN WHICH IS NOT NAMED ENTITY

FIG. 7

| SPOKEN TEXT | CHA AE SEOLCHIDOEN AEEOBAEG I CHONG MYEOT GAEYA? |
|---|---|
| NORMALIZATION RESULT | CHA AE SEOLCHIDOEN AEEOBAEG I CHONG MYEOT GAEYA |
| SYLLABLE ANALYSIS RESULT | CHA AE SEOL CHI DOEN AE EO BAEG I CHONG MYEOT GAE YA |
| BOUNDARY IDENTIFICATION OF SPACING | B E B I E B I I E B B B I |

FORMAT CONVERSION FOR BOUNDARY IDENTIFICATION OF SPACING -> B: BOUNDARY BEGINS, I: BOUNDARY CONTINUES , E: BOUNDARY ENDS

NAMED ENTITY RECOGNITION SYSTEM AND NAMED ENTITY RECOGNITION METHOD

CROSS-REFERENCE TO RELATED APPLICATION

This application is based on and claims priority under 35 U.S.C. § 119 to Korean Patent Application No. 10-2021-0188485, filed on Dec. 27, 2021, in the Korean Intellectual Property Office, the disclosure of which is incorporated herein by reference.

BACKGROUND

1. Technical Field

The disclosure relates to a named entity recognition system and a named entity recognition method that may recognize a named entity from a user's speech.

2. Background Art

A dialogue system is a system capable of identifying a user's intention through a dialogue with the user and providing a service corresponding to the identified intention. In association with a specific device, the dialogue system also performs control on the device or provides specific information according to a user's intention.

To this end, a user's speech input is required to be recognized more accurately.

In order to recognize a user's speech inside a vehicle, named entity recognition related to a vehicle domain is required to be performed. However, since named entity recognition has been mainly studied on the news domain and biomedical domain, the amount of vehicle domain is relatively small.

Also, in existing speech recognition systems, errors related to spacing in input sentence frequently occurred due to lack of performance.

SUMMARY

An aspect of the disclosure provides a named entity recognition system and a named entity recognition method that may perform an improved named entity recognition through domain adversarial training, even with respect to a named entity of a low-resource vehicle domain, and improve a performance of identifying a boundary between words, through multi-task learning for named entity recognition and boundary identification of spacing.

According to an embodiment of the disclosure, there is provided a named entity recognition system, including: an input module configured to recognize a speech input of a user and convert the speech input into text; a preprocessing module configured to separate the text in units of syllables and perform transformation; and a learning module configured to perform multi-task learning for recognizing a named entity and perform multi-task learning for identifying a boundary of spacing with respect to the input sequence, and output a result of recognizing the multi-task learning for recognizing the named entity and output a result of the multi-task learning for identifying the boundary of spacing.

The named entity includes terms from a plurality of domains.

The named entity includes terms related to a vehicle.

The learning module further includes: an encoding module configured to encode the transformed text; and a domain identification module configured to distinguish between domains of the plurality of domains with respect to the named entity.

The encoding module includes: a first encoding layer configured to perform global encoding on the input sequence; and a second encoding layer configured to perform bidirectional encoding on an output of the first encoding layer.

The learning module is further configured to calculate a probability value of boundary classification of spacing to identify the boundary of spacing.

The learning module is further configured to calculate a probability value of named entity classification to recognize the named entity.

The domain identification module is further configured to perform domain adversarial training with respect to the named entity belonging to the plurality of domains.

The named entity recognition system further includes a speech recognizer configured to recognize the speech input of the user.

According to an embodiment of the disclosure, there is provided a named entity recognition method, including: recognizing a speech input of a user and converting the speech input into text; separating the text into units of syllables; transforming a format of the text; outputting an input sequence corresponding to the text, performing multi-task learning for (a) recognizing a named entity and (b) identifying a boundary of spacing with respect to the input sequence; and outputting a result of the recognizing the named entity step and a result of the identifying the boundary of spacing.

The named entity includes terms from a plurality of domains.

The named entity includes terms related to a vehicle.

The named entity recognition method further includes: encoding the transformed text; and distinguishing between domains of the plurality of domains with respect to the named entity.

The encoding of the transformed text step further includes: performing global encoding on the transformed text; and performing bidirectional encoding on an output of the global encoding.

The identifying of the boundary of spacing step further comprises calculating a probability value of boundary classification of spacing to identify the boundary of spacing.

The recognizing of the named entity step further comprises calculating a probability value of named entity classification to recognize the named entity.

The named entity recognition method further includes: performing domain adversarial training with respect to the named entity belonging to the plurality of domains.

In some embodiments, a non-transitory computer-readable medium storing computer-executable instructions may be provided. In various implementations, when executed by a processor, these instructions are configured to cause the processor to perform a named entity recognition method.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 is a diagram illustrating examples of a user's speech according to an embodiment;

FIG. 6 illustrates an example of outputting a speech recognition result obtained by processing user's spoken text by a preprocessing module;

FIG. 7 illustrates an example of outputting a result of identifying a boundary of spacing obtained by processing user's spoken text by a preprocessing module;

DETAILED DESCRIPTION

Figure 1:
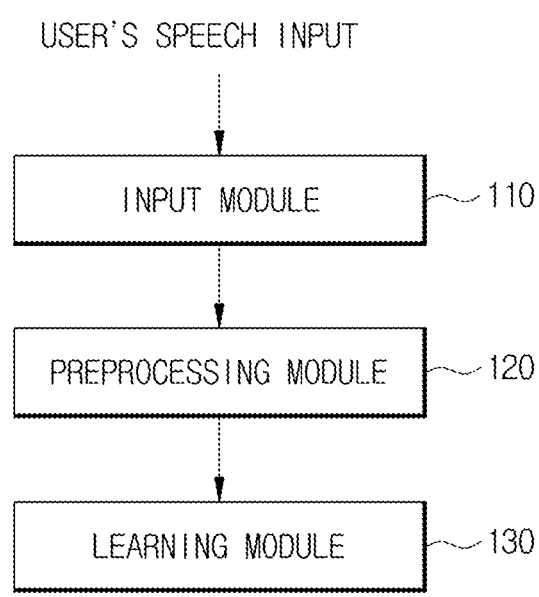
FIG. 1 is a control block diagram illustrating a named entity recognition system according to an embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

As used herein, a "module" and/or a "controller" can include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to the processing controller (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. In addition, the controller can include antennas, network interfaces that provide wireless and/or wire line digital and/or analog interface to one or more networks over one or more network connections (not shown), a power source that provides an appropriate alternating current (AC) or direct current (DC) to power one or more components of the controller, and a bus that allows communication among the various disclosed components of the module and/or controller. Although example embodiments are described as using a plurality of units to perform the example processes, it is understood that the exemplary processes may also be performed by one module or plurality of modules.

The embodiments set forth herein and illustrated in the configuration of the disclosure are only preferred embodiments, so it should be understood that they may be replaced with various equivalents and modifications at the time of the disclosure.

Terminologies used herein are for the purpose of describing particular embodiments only and is not intended to limit the disclosure. It is to be understood that the singular forms are intended to include the plural forms as well, unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

Further, the terms such as "~part", "~device", "~block", "~member", "~module", and the like may refer to a unit for processing at least one function or act. For example, the terms may refer to at least one process processed by at least one hardware, such as field-programmable gate array (FPGA)/application specific integrated circuit (ASIC), software stored in memories or processors.

It will be understood that, although the terms first, second, etc. may be used herein to describe various elements, these elements should not be limited by these terms.

Reference numerals used for method steps are just used for convenience of explanation, but not to limit an order of the steps. Thus, unless the context clearly dictates otherwise, the written order may be practiced otherwise.

Embodiments can be implemented through computer readable code/instructions in/on a medium, e.g., a computer readable medium, to control at least one processing element to implement any above-described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Hereinafter, embodiments of a named entity recognition system and a named entity recognition according to an aspect of the disclosure will be described in detail with reference to the accompanying drawings.

Figure 2:
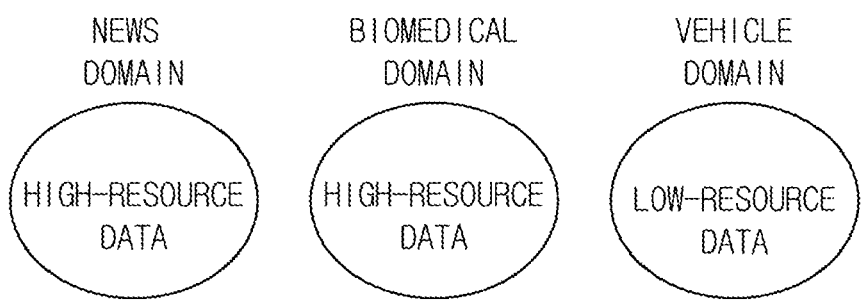
FIG. 2 is a diagram illustrating types of domains of named entities.

FIG. 1 is a control block diagram illustrating a named entity recognition system according to an embodiment. FIG. 2 is a diagram illustrating types of domains of named entities.

Referring to FIG. 1, a named entity recognition system 1 according to an embodiment may include an input module 110, a preprocessing module 120 and a learning module 130.

The input module 110 may recognize a user's speech input and convert the user's speech input into text.

The preprocessing module 120 may separate the speech converted into the text (hereinafter, 'spoken text') in units of syllables, and perform transformation.

The learning module 130 may perform multi-task learning for named entity recognition and boundary identification of spacing with respect to the transformed text, and output a result of the named entity recognition and a result of the boundary identification of spacing, based on the named entity recognition and the boundary identification of spacing.

The named entity refers to a proper noun, such as names of an individual person, place and organization, day, and the like.

The named entity may be present in various domains, and in the disclosure, the named entity may include terms related to a vehicle.

The vehicle-related named entity is a word having a unique meaning related to a vehicle, such as an airbag, seatbelt, etc.

Referring to FIG. 2, the named entity may include named entities belonging to a news domain, named entities belonging to a biomedical domain, and named entities belonging to a vehicle domain.

The named entities belonging to the news domain and the biomedical domain where research on named entity recognition has been actively performed have high-resource data, whereas the named entities belonging to the vehicle domain have a relatively small amount of data, e.g., (low-resource data).

Accordingly, named entity recognition with respect to the vehicle domain is not performed accurately during speech recognition.

According to the disclosure, to overcome such disadvantages, adversarial training is performed to output an improved recognition result even with respect to the named entities of the vehicle domain which is a low-resource domain, which is described in detail later.

FIG. 3 is a diagram illustrating examples of a user's speech according to an embodiment.

A user may ask various questions by voice, for example, 'how many airbags are installed in the car?' or 'how do I unfasten the seatbelt?' as shown in FIG. 3.

When the user's speech is input, the input module 110 converts the speech into spoken text, and then a named entity of vehicle may be recognized and spacing may be identified from the user's speech through the preprocessing module 120 and the learning module 130.

The named entity recognition system 1 may further include a speech recognizer 150 to recognize the user's speech.

Figure 4:
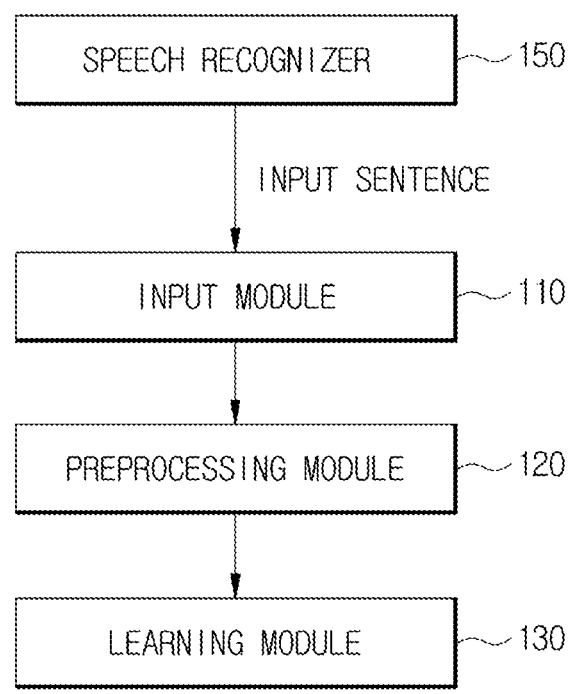
FIG. 4 is another control block diagram illustrating a named entity recognition system according to an embodiment.
Figure 5:
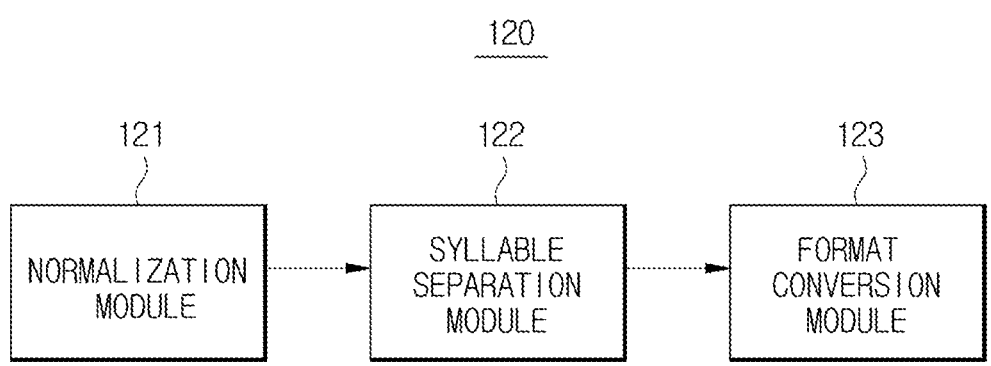
FIG. 5 is a control block diagram illustrating a configuration of a preprocessing module of a named entity recognition system according to an embodiment.

FIG. 4 is another control block diagram illustrating a named entity recognition system according to an embodiment. FIG. 5 is a control block diagram illustrating a configuration of a preprocessing module of a named entity recognition system according to an embodiment.

The named entity recognition system 1 according to an embodiment may further include the speech recognizer 150 that converts a user's speech which is a speech signal into text, i.e., a sentence.

The speech recognizer 150 may be implemented as a speech to text (STT) engine, and convert the user's speech into text by applying a speech recognition algorithm to the user's speech.

For example, the speech recognizer 150 may use feature vector extraction techniques such as Cepstrum, linear predictive coefficient (LPC), Mel frequency cepstral coefficient (MFCC), filter bank energy, or the like, to extract a feature vector from the user's speech.

Also, the speech recognizer 150 may compare the extracted feature vector with trained reference pattern to obtain a recognition result. To this end, an acoustic model that models and compares signal characteristics of a speech or a language model that models a linguistic order relationship of words or syllables corresponding to a recognized vocabulary may be used.

In addition, the speech recognizer 150 may convert the user's speech into the text based on learning using machine learning or deep learning. According to the embodiment, a method of converting a user's speech into text by the speech recognizer 150 is not limited thereto, and thus the speech recognizer 150 may convert the user's speech into the text by applying a variety of speech recognition techniques in addition to the above-described method.

The text corresponding to the user's speech may be input to the preprocessing module 120 and converted into a form that may be processed by a deep learning model.

Referring to FIG. 5, the preprocessing module 120 may include a normalization module 121 that normalizes spoken text, a syllable separation module 122 that separates the spoken text in units of syllables, and a format conversion module 123 that converts a format of the spoken text.

The normalization module 121 may perform normalization to exclude meaningless data such as special characters, symbols, and the like, from an input sentence. It is assumed that all the spoken text processed by the constituent components to be described later is normalized spoken text.

In such normalized spoken text, syllable separation may be performed by the syllable separation module 122.

The format conversion module 123 may perform indexing on the spoken text based on a result of the syllable separation. Specifically, the format conversion module 123 may assign an index to each of a plurality of words or each of a plurality of features constituting the spoken text by using a predefined dictionary. The index assigned in the format conversion process may indicate a position of a word in the dictionary. The user's spoken text may be indexed in units of syllable by the format conversion module 123. The indexes assigned to the spoken text by the format conversion module 123 may be used in an embedding process.

Hereinafter, a user's speech processed by the preprocessing module 120 is described in detail as an example.

FIGS. 6 and 7 are diagrams illustrating operations of processing user's spoken text by the preprocessing module. An input sentence of the example described in FIGS. 6 and 7 is a Korean sentence.

A user's question of "CHA AE SEOLCHIDOEN AEEOBAEG I CHONG MYEOT GAEYA?(How many airbags are installed in the car?)" is used as an example in FIGS. 6 and 7.

The user's speech is converted into text through the input module 110, and normalization is performed on the converted text by a normalization model to remove a special character "?".

When the syllable separation module 122 separates the normalized spoken text in units of syllables, a result such as "CHA, AE, SEOL, CHI, DOEN, AE, EO, BAEG, I, CHONG, MYEOT, GAE, YA" may be output.

The format conversion module 123 may perform indexing on the result of syllable separation. Specifically, the format conversion module 123 may assign an index to each of a plurality of words or a plurality of features of the input sentence, i.e., the spoken text, by using a predefined dictionary. The index assigned in the format conversion process may indicate a position of a word in the dictionary.

Afterwards, the learning module 130 may label each token in the input sequence with a B-I-O tag (when recognizing a named entity) or a B-I-E tag (when recognizing a boundary of spacing).

When recognizing a named entity, B may be assigned to a part where a vehicle-related entity name begins, I may be assigned to a part where the vehicle-related entity name continues, and O may be assigned to a part that is not a vehicle-related entity name.

Also, when recognizing a boundary of spacing, B may be assigned to a part where the boundary between words begins, I may be assigned to a part where no spacing occurs, and E may be assigned to a part where the boundary between words ends, which will be described in greater detail later when describing the learning module 130.

Figure 8:
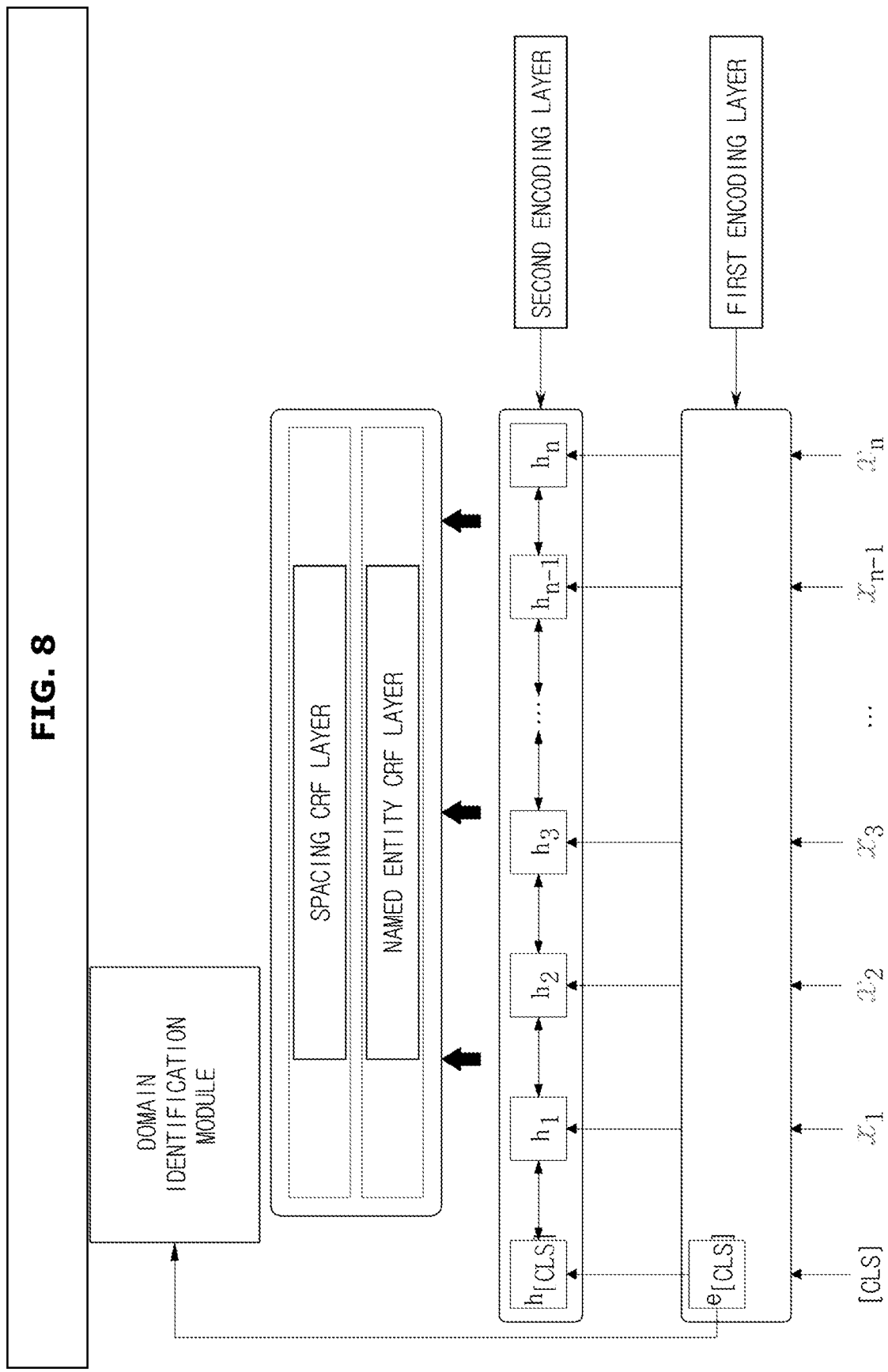
FIG. 8 is a conceptual diagram specifically illustrating a learning module.

FIG. 8 is a conceptual diagram specifically illustrating a learning module.

When spoken text processed by the preprocessing module 120 is input to the learning module 130, an encoding module 131 performs encoding on the spoken text.

Specifically, global ending may be performed in a first encoding layer of the encoding module 131, and bidirectional encoding may be performed in a second encoding layer with respect to an output of the first encoding layer.

Networks that encode an input sequence into a deep learning model may include a recurrent neural network (RNN), a convolutional neural network (CNN), and transformer.

Among them, the transformer is based on an attention mechanism. The attention may calculate an arbitrary position of an input sequence and an alignment score with all elements of a target sequence. The transformer is constructed with a plurality of attentions described above in parallel and uses a self-attention layer that considers the target sequence as the input sequence.

Accordingly, where the transformer is used in the model according to the disclosure is referred to as a global encoder.

In the RNN, linear calculations are sequentially performed for each input token, and thus the RNN is referred as a sequential encoder.

An output of the second encoding layer may be input to a conditional random field (CRF) layer. The output of the second encoding layer may be input to a named entity CRF layer and a spacing CRF layer, and thus a result of named entity recognition and a result of boundary identification of spacing may be output.

Also, an output of the first encoding layer may be input to a domain identification module 132, and adversarial learning may be performed with respect to a named entity belonging to a plurality of domains, which will be described in detail later.

Figure 9:
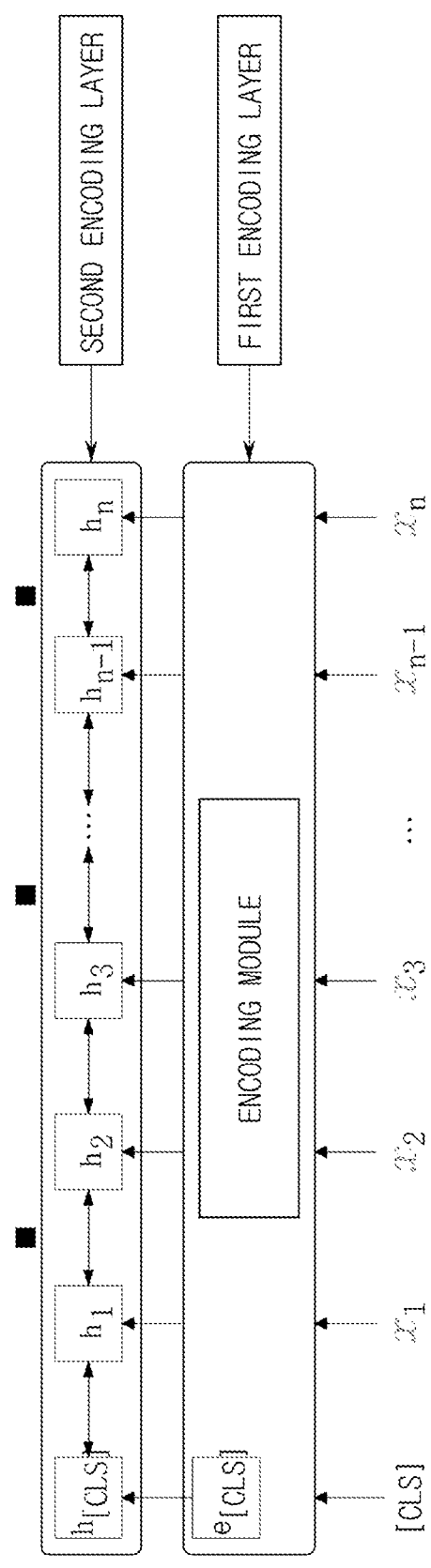
FIG. 9 is a conceptual diagram specifically illustrating an encoding module.

FIG. 9 is a conceptual diagram specifically illustrating an encoding module.

The encoding module 131 may encode tokens of an input sequence represented as a vector through embedding. Because the named entity recognition system 1 according to an embodiment only classifies the input sequence without generating a new output sentence, decoding may be omitted.

To improve a performance, the encoding module 131 may include a first encoding layer that performs global encoding and a second encoding layer that performs bidirectional encoding. Each of the first and second encoding layers may include a plurality of hidden layers.

The first encoding layer that performs global encoding may encode the entire input sequence at once, and the second encoding layer may sequentially receive tokens and perform bidirectional encoding. According to an embodiment, the encoding module 131 may perform both global encoding and bidirectional encoding, thereby improving an accuracy of information about an order or position of words in the input sentence and preventing information about a previous input from being lost as encoding is performed.

The first and second encoding layers may be implemented by various algorithms. For example, the first encoding layer may use an attention algorithm. According to the attention algorithm, a part of the entire input sequence related to a word to be predicted at a specific point in time may be referenced with attention.

For example, the first encoding layer may use an encoder of a transformer (Vaswani et al., 2017) including a plurality of self-attention layers, and the second encoding layer may use an algorithm such as the RNN, bidirectional gated recurrent units (BiGRU), etc., for sequential encoding.

In this case, each hidden state of the first encoding layer may be input to the second encoding layer, and the second encoding layer may bidirectionally encode the hidden states to generate a sequentially encoded context vector.

The encoded hidden states may be input to the CRF layer, which will be described later.

Figure 10:
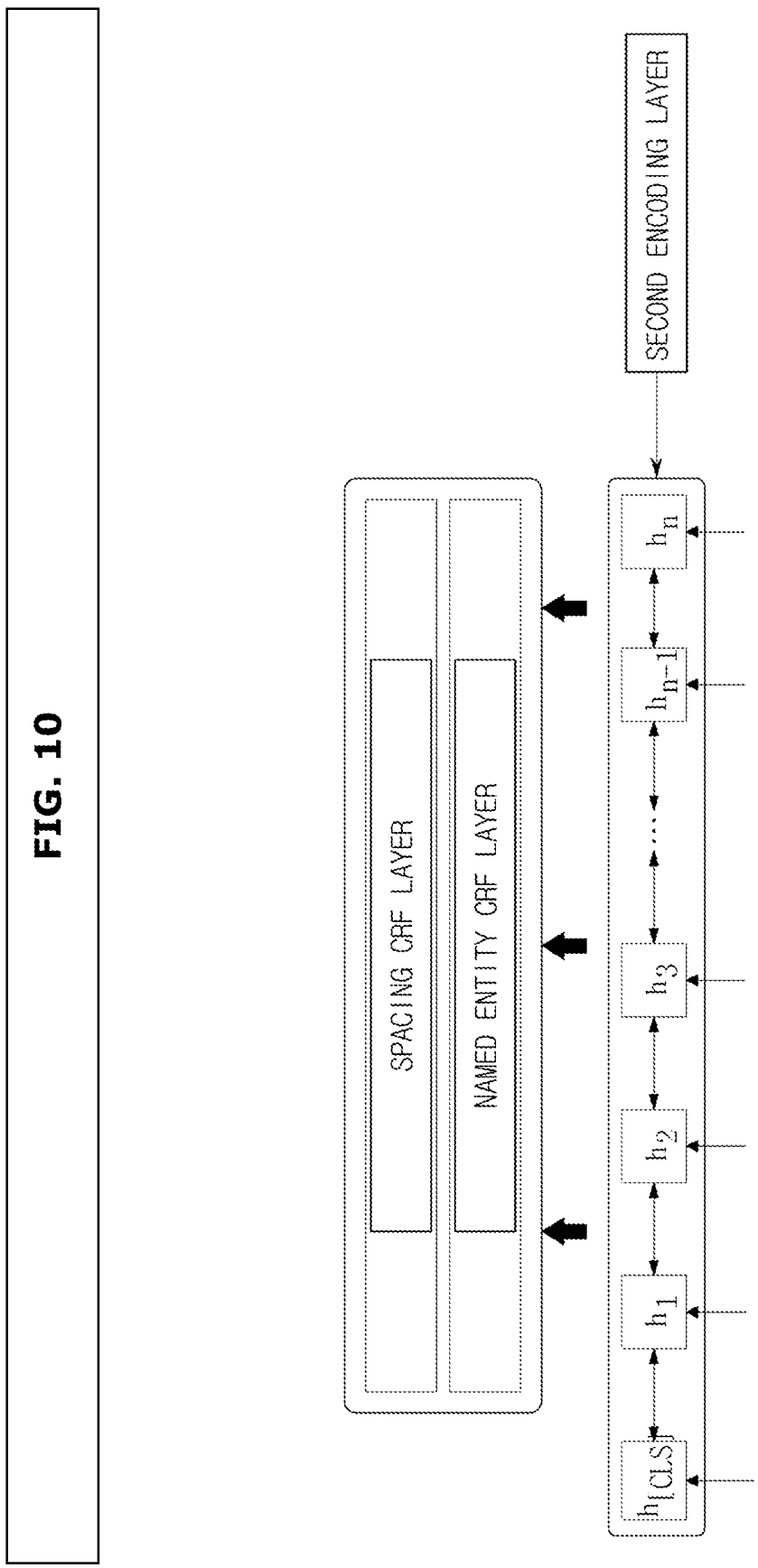
FIG. 10 is a diagram illustrating that encoded hidden states are input to a conditional random field (CRF) layer.

FIG. 10 is a diagram illustrating that encoded hidden states are input to a CRF layer.

As described above, encoded hidden states may be input to a CRF layer.

According to the embodiment, the learning module 130 may include a named entity CRF layer for recognizing a named entity and a spacing CRF layer for outputting a boundary of spacing.

The spacing CRF may calculate a probability value of boundary classification of spacing, based on the input hidden states, to identify the boundary of spacing.

Specifically, the encoded hidden states may be transmitted and input to the spacing CRF layer for boundary classification of spacing.

The CRF layer may calculate a loss of word space by outputting a word space tag corresponding to each syllable.

In this case, a negative log-likelihood of a named entity recognition (NER) CRF layer and spacing CRF layer may be used, and a related equation is as follows.

$$L_e = -\frac{1}{N}\sum_{i=1}^{N}\log P(y_i^e \mid s_i^e)$$

$$L_w = -\frac{1}{N}\sum_{i=1}^{N}\log P(y_i^w \mid s_i^w)$$

In this instance, as shown in FIG. 7, each token of the input sequence may be labelled with a B-I-E tag. Here, B may be assigned to a part where the boundary between words begins, I may be assigned to a part where no spacing occurs, and E may be assigned to a part where the boundary between words ends.

The named entity CRF may calculate a probability value of named entity classification based on the input hidden states, in order to recognize a named entity.

Specifically, the encoded hidden states may be transmitted and input to the named entity CRF layer for named entity recognition.

The CRF layer may calculate a loss of named entity by outputting a word space tag corresponding to each syllable.

In this case, a negative log-likelihood of an NER CRF layer and spacing CRF layer may be used, and a related equation is as follows.

$$L_e = -\frac{1}{N}\sum_{i=1}^{N} \log P(y_i^e | s_i^e)$$

$$L_w = -\frac{1}{N}\sum_{i=1}^{N} \log P(y_i^w | s_i^w)$$

When recognizing a named entity, labelling may be performed on a proper noun corresponding to a named entity in a sentence. In this instance, a label may indicate types of named entity.

A named entity may belong to a general domain such as location names (Loc), person names (per), organization names (Org), etc., and a vehicle domain such as a type (CT), body (BD), chassis (CS), safety (ST), and the like. Also, the named entity may be a single noun, or a proper noun composed of compound nouns.

Accordingly, when outputting a named entity, a label indicating a range is required, and the label indicating the range may use a B-I-O tag as described below.

As shown in FIG. 6, each toke of the input sequence may be labelled with the B-I-O tag. In this instance, B may be assigned to a part where a vehicle-related entity name begins, I may be assigned to a part where the vehicle-related entity name continues, and O may be assigned to a part that is not a vehicle-related entity name.

When learning a named entity and boundary of spacing, a loss value may be calculated using both an output of the named entity label and an output of the boundary of spacing, and multi-task learning may be performed.

By learning using the output of the boundary of spacing, an error in identifying spacing may be reduced.

Hereinafter, with respect to named entities of a low-resource vehicle domain, named entity learning through adversarial training is described.

According to the disclosure, a domain adversarial training method capable of learning with a single model for two domains is used. During training, labels that may be classified by domain may be predicted. For example, 1 for a news domain and 0 for a vehicle domain may be output, respectively.

Learning is induced to prevent the domain identification module 132 from properly classifying such output results. A kullback-Leibler divergence is used as the domain adversarial training method, and uniform distribution (U) and output results are calculated. When the output results are close to the U, classification between the two domains becomes difficult, and thus whether the input sentence belongs to the news domain or vehicle domain may not be accurately identified.

By using the above-described method, learning and reference may be performed with a single model for two different domains.

Figure 11:
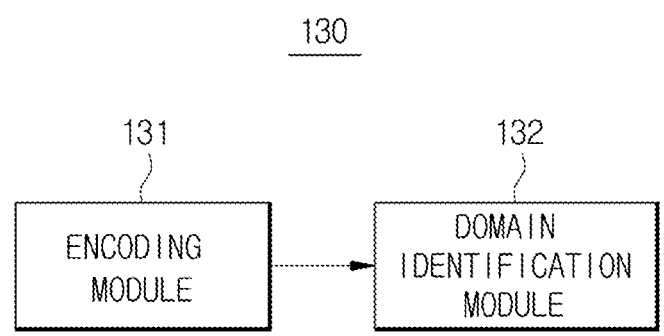
FIG. 11 is a diagram illustrating an encoding module and a domain identification module included in a learning module.

FIG. 11 is a diagram illustrating an encoding module and a domain identification module included in a learning module.

Referring to FIG. 11, the learning module 130 may include the encoding module 131 and the domain identification module 132. An output of the encoding module 131 may be input to the domain identification module 132. Specifically, as shown in FIG. 8, the output of the first encoding layer may be input to the domain identification module 132.

The domain identification module 132 may distinguish a plurality of domains with respect to a named entity belonging to the plurality of domains, and perform domain adversarial training with respect to the named entity belonging to the plurality of domains.

Because research on news domain or biomedical domain has been actively conducted, a large amount of data on named entity has been established, whereas the amount of data related to a vehicle domain is relatively small.

Accordingly, by learning several different domains at once, named entity recognition related to the vehicle domain may be performed accurately.

During multi-task learning, the domain identification module 132 may perform domain adversarial training to induce a learning model not to distinguish two domains.

Specifically, the domain identification module 132 may distinguish two different domains, i.e., a named entity of the vehicle domain and a named entity of another domain, and output. For example, 1 for a named entity corresponding to a news domain and 0 for a named entity corresponding to the vehicle domain may be output, respectively.

However, when calculating a correct answer and loss, a value that is obtained by randomly sampling a correct answer label according to a uniform distribution may be used.

Accordingly, the learning model may not distinguish whether the named entity of the input sentence belongs to the news domain or vehicle domain, and thus named entity recognition may be performed regardless of domain.

Therefore, according to an embodiment of the disclosure, the named entity corresponding to the news domain and the named entity corresponding to the vehicle domain may be output as a single learning model. Accordingly, only one model is required to be managed and a size of resource is not increased, thereby leading to an easy management and cost reduction.

Figure 12:
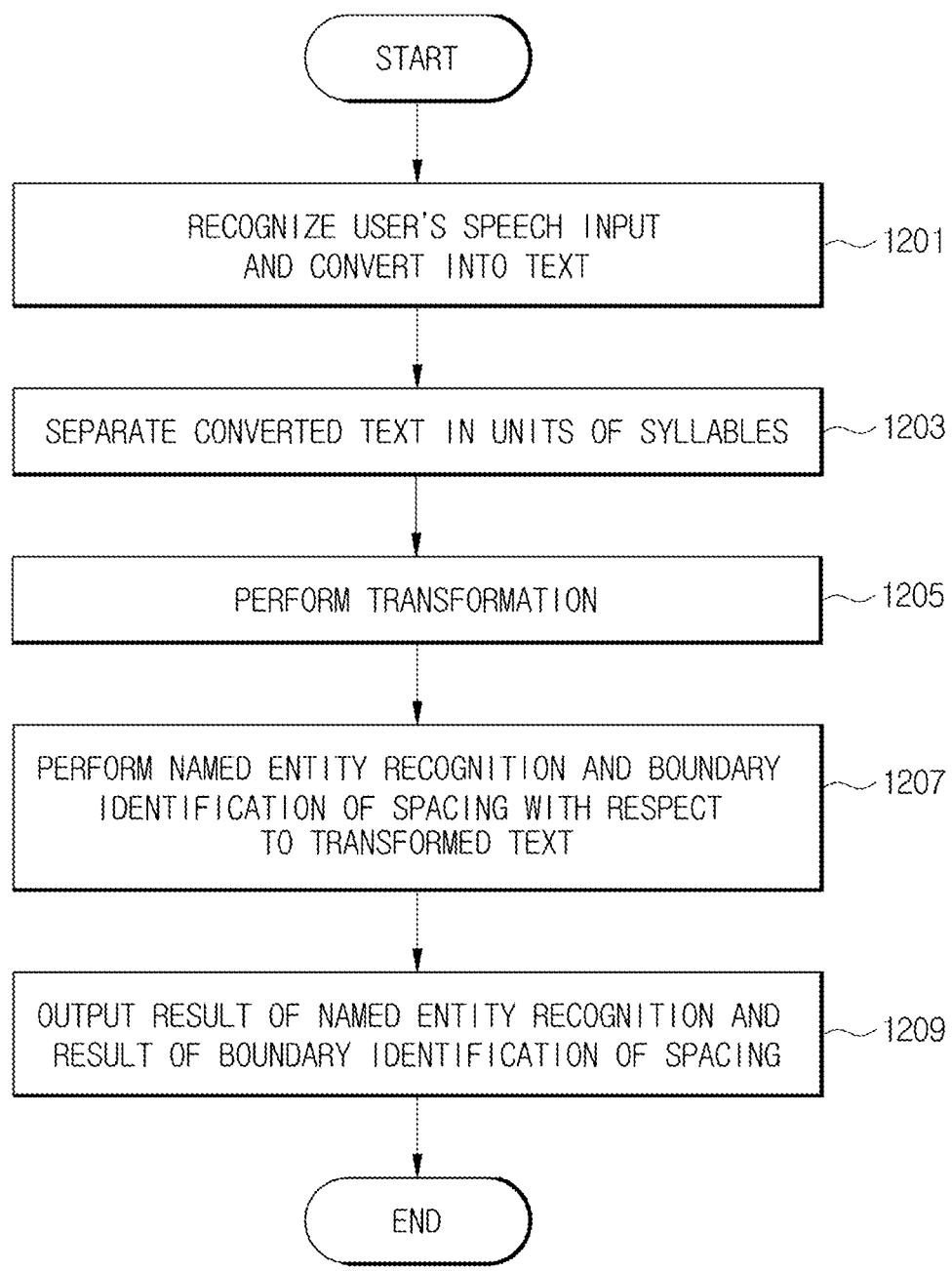
FIG. 12 is a flowchart illustrating a named entity recognition method according to an embodiment.

FIG. 12 is a flowchart illustrating a named entity recognition method according to an embodiment.

First, when a user's speech is input to the input module 110, the input module 110 may recognize the user's speech input and convert the user's speech into text (1201).

Afterwards, the preprocessing module 120 may separate the speech input converted into the text (spoken text) in units of syllables (1203), and perform transformation (1205).

The preprocessing module 120 may include the normalization module 121 that normalizes spoken text, the syllable separation module 122 that separates the spoken text in units of syllables, and the format conversion module 123 that converts a format of the spoken text.

The normalization module 121 may perform normalization to exclude meaningless data such as special characters, symbols, and the like, from an input sentence. It is assumed that all the spoken text processed by the constituent components is normalized spoken text.

In such normalized spoken text, syllable separation may be performed by the syllable separation module 122.

The format conversion module 123 may perform indexing on the spoken text based on a result of the syllable separation. Specifically, the format conversion module 123 may assign an index to each of a plurality of words or each of a plurality of features constituting the spoken text by using a predefined dictionary. The index assigned in the format conversion process may indicate a position of a word in the dictionary. The user's spoken text may be indexed in units of syllable by the format conversion module 123. The indexes assigned to the spoken text by the format conversion module 123 may be used in an embedding process.

The learning module 130 may perform multi-task learning for named entity recognition and boundary identification of spacing with respect to the transformed text (1207), and output a result of the named entity recognition and a result of the boundary identification of spacing, based on the named entity recognition and the boundary identification of spacing (1209).

The learning module 130 may include a named entity CRF layer for recognizing a named entity and a spacing CRF layer for outputting a boundary of spacing.

The spacing CRF may calculate a probability value of boundary classification of spacing, based on input hidden states, to identify the boundary of spacing.

In this instance, each token of an input sequence may be labelled with a B-I-E tag. Here, B may be assigned to a part where the boundary between words begins, I may be assigned to a part where no spacing occurs, and E may be assigned to a part where the boundary between words ends.

The named entity CRF may calculate a probability value of named entity classification based on the input hidden states, in order to recognize a named entity.

In this instance, each token of an input sequence may be labelled with a B-I-O tag. Here, B may be assigned to a part where a vehicle-related entity name begins, I may be assigned to a part where the vehicle-related entity name continues, and O may be assigned to a part that is not a vehicle-related entity name.

When learning a named entity and boundary of spacing, a loss value may be calculated using both an output of named entity label and an output of boundary of spacing, and multi-task learning may be performed.

Before being input to the CRF layer of the learning module 130, encoding may be performed twice with respect to the spoken text processed by the preprocessing module 120.

The encoding module 131 may encode tokens of an input sequence represented as a vector through embedding. Because the named entity recognition system 1 according to an embodiment only classifies the input sequence without generating a new output sentence, decoding may be omitted.

To improve a performance, the encoding module 131 may include a first encoding layer that performs global encoding and a second encoding layer that performs bidirectional encoding. Each of the first and second encoding layers may include a plurality of hidden layers.

The first encoding layer that performs global encoding may encode the entire input sequence at once, and the second encoding layer may sequentially receive tokens and perform bidirectional encoding. According to an embodiment, the encoding module 131 may perform both global encoding and bidirectional encoding, thereby improving an accuracy of information about an order or position of words in an input sentence and preventing information about a previous input from being lost as encoding is performed.

The first and second encoding layers may be implemented by various algorithms. For example, the first encoding layer may use an attention algorithm. According to the attention algorithm, a part of the entire input sequence related to a word to be predicted at a specific point in time may be referenced with attention.

For example, the first encoding layer may use an encoder of a transformer (Vaswani et al., 2017) including a plurality of self-attention layers, and the second encoding layer may use an algorithm such as the RNN, bidirectional gated recurrent units (BiGRU), etc., for sequential encoding.

In this case, each hidden state of the first encoding layer may be input to the second encoding layer, and the second encoding layer may bidirectionally encode the hidden states to generate a sequentially encoded context vector.

The encoded hidden states may be input to the CRF layer described above.

According to the embodiment, the named entity recognition system 1 and the named entity recognition method can perform an improved named entity recognition through domain adversarial training, even with respect to a named entity of a low-resource vehicle domain, and reduce an error in identifying a boundary of spacing, through a multi-task learning for named entity recognition and boundary identification of spacing.

As is apparent from the above, according to the embodiments of the disclosure, the named entity recognition system and the named entity recognition method can perform an improved named entity recognition through domain adversarial training, even with respect to a named entity of a low-resource vehicle domain, and improve a performance of identifying a boundary of spacing, through a multi-task learning for named entity recognition and boundary identification of spacing.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A named entity recognition system, comprising:
an input module configured to recognize a speech input of a user and convert the speech input into text;
a preprocessing module configured to: separate the text into units of syllables, and transform a format of the text to output an input sequence corresponding to the text; and
a learning module configured to:
perform labeling by assigning tags for recognizing at least one of a named entity, a beginning portion of the named entity, a continuing portion of the named entity, or a portion that is not the named entity;
perform labeling for recognizing a boundary of spacing by assigning tags to at least one of a beginning portion of spacing, a continuing portion of spacing, or an ending portion of spacing;
perform multi-task learning for recognizing the named entity and perform multi-task learning for identifying the boundary of spacing with respect to the input sequence, wherein the named entity includes terms from a plurality of domains; and
output a result of the multi-task learning for recognizing the named entity and output a result of the multi-task learning for identifying the boundary of spacing,
wherein the learning module includes a named entity conditional random field (CRF) layer for recognizing the named entity and a spacing CRF layer for outputting the boundary of spacing, wherein the spacing CRF layer is configured to calculate a probability value of boundary classification of spacing to identify the boundary of spacing, and wherein the named entity CRF layer is configured to calculate a probability value of named entity classification to recognize the named entity.

2. The named entity recognition system of claim 1, wherein the named entity includes terms related to a vehicle.

3. The named entity recognition system of claim 1, wherein the learning module further comprises:
   an encoding module configured to encode the input sequence; and
   a domain identification module configured to distinguish between domains of the plurality of domains with respect to the named entity.

4. The named entity recognition system of claim 3, wherein the encoding module further comprises:
   a first encoding layer configured to perform global encoding on the input sequence; and
   a second encoding layer configured to perform bidirectional encoding on an output of the first encoding layer.

5. The named entity recognition system of claim 3, wherein the domain identification module is further configured to perform domain adversarial training with respect to the named entity belonging to the plurality of domains.

6. The named entity recognition system of claim 1, further comprising:
   a speech recognizer configured to recognize the speech input of the user.

7. A named entity recognition method, comprising:
   recognizing a speech input of a user and converting the speech input into text;
   separating the text into units of syllables;
   transforming a format of the text;
   outputting an input sequence corresponding to the text;
   performing multi-task learning for (a) recognizing a named entity and (b) identifying a boundary of spacing with respect to the input sequence, wherein the named entity includes terms from a plurality of domains, wherein recognizing the named entity includes performing labeling by assigning tags to a beginning portion of the named entity, a continuing portion of the named entity, or a portion that is not the named entity, and identifying the boundary of spacing includes performing labeling by assigning tags to at least one of a beginning portion of spacing, a continuing portion of spacing, or an ending portion of spacing; and
   outputting a result of the recognizing the named entity step and a result of the identifying the boundary of spacing step,
   wherein identifying the boundary of spacing further comprises calculating, by a spacing conditional random field (CRF) layer, a probability value of boundary classification of spacing to identify the boundary of spacing, and
   wherein recognizing the named entity further comprises calculating, by a named entity CRF layer, a probability value of named entity classification to recognize the named entity.

8. The named entity recognition method of claim 7, wherein the named entity includes terms related to a vehicle.

9. The named entity recognition method of claim 7, further comprising:
   encoding the input sequence; and
   distinguishing between domains of the plurality of domains with respect to the named entity.

10. The named entity recognition method of claim 9, wherein the encoding of the input sequence step further comprises:
    performing global encoding on the input sequence; and
    performing bidirectional encoding on an output of the global encoding.

11. The named entity recognition method of claim 9, further comprising:
    performing domain adversarial training with respect to the named entity belonging to the plurality of domains.

12. A non-transitory computer-readable medium storing computer-executable instructions that, when executed by a processor, are configured to cause the processor to perform the method of claim 7.

\* \* \* \* \*